US008153552B2

(12) United States Patent
Cau Dit Coumes et al.

(10) Patent No.: US 8,153,552 B2
(45) Date of Patent: Apr. 10, 2012

(54) CEMENT-BASED COMPOSITION FOR THE EMBEDDING OF A BORON-CONTAINING AQUEOUS SOLUTION, EMBEDDING PROCESS AND CEMENT GROUT COMPOSITION

(75) Inventors: Céline Cau Dit Coumes, Tavel (FR); Didier Maurel, Saint Gervais (FR); Maud Codina, Versailles (FR)

(73) Assignee: Commissariat a l'Energie Atomique, Paris (FR)

( * ) Notice: Subject to any disclaimer, the term of this patent is extended or adjusted under 35 U.S.C. 154(b) by 788 days.

(21) Appl. No.: 12/300,526

(22) PCT Filed: May 16, 2007

(86) PCT No.: PCT/EP2007/054779
§ 371 (c)(1),
(2), (4) Date: Nov. 12, 2008

(87) PCT Pub. No.: WO2007/135067
PCT Pub. Date: Nov. 29, 2007

(65) Prior Publication Data
US 2009/0156878 A1    Jun. 18, 2009

(30) Foreign Application Priority Data
May 18, 2006  (FR) ..................................... 06 51823

(51) Int. Cl.
*B01J 20/00* (2006.01)
(52) U.S. Cl. ......................... 502/407; 502/414; 502/415
(58) Field of Classification Search .................. 502/407, 502/410, 414, 415; 588/3
See application file for complete search history.

(56) References Cited

U.S. PATENT DOCUMENTS
| | | | |
|---|---|---|---|
| 4,906,408 | A | 3/1990 | Bouniol |
| 6,419,738 | B1 | 7/2002 | Classen et al. |
| 6,730,162 | B1 | 5/2004 | Li et al. |

FOREIGN PATENT DOCUMENTS
| | | |
|---|---|---|
| EP | 0 305 541 | 3/1989 |
| EP | 0 319 398 | 6/1989 |
| FR | 2 796 934 | 2/2001 |
| FR | 2 807 424 | 10/2001 |
| GB | 2 137 403 | 10/1984 |
| WO | WO 98/49115 | 11/1998 |
| WO | WO 2006/027554 | 3/2006 |

OTHER PUBLICATIONS

Roux, Charles, "*Conditionnement par des Liants Hydrauliques de Concentrats Boratés Radioactifs*", Thèse de Doctorat de l'Université Paris Sud-Orsay, Nov. 23, 1989, 384.
Roux, Charles, "*Packaging for Hydraulic Binders Concentrates Borates Radioactive*", Doctoral Thesis at The University of Paris at Orsay, Nov. 23, 1989, 384.
Masonnave, J.M. Casabonne, "*Immobilization of Borates and Phosphates Anions with Saturated Lime Solutions*", Solid State Ionics, vol. 59, 1993, pp. 133-139, Elsevier Science Publishers B.V.
Bell, I.S. et al., "*Molecular Modelling of the Mechanism of Action of Borate Retarders on Hydrating Cements at High Temperature*", Molecular Simulation, vol. 20, 1998, pp. 331-356, Overseas Publishers Association.
Goni, S. et al., "*Stability of Calcium Aluminate Cement Matrices Mixed with Borate Solution*", Proc. Intern. Conf. on Calcium Aluminate Cements CAC, Jul. 16-19, 2001, pp. 425-435.
ANDRA Technical Specification No. ACO SP ASRE 99-004/A (Jan. 1999).
ANDRA Technical Specification No. ACO SP ASRE 99-005/A (Jan. 1999).
Benavides, E., "Immobilization of evaporator concentrates with high boron content in a cement matrix", SIEN' 97, International Symposium on Nuclear Energy Radioactive Waste Management, Bucharest, 1997, p. 470-471, vol. 2.
Bensted, J., et al., "Comparative study of the efficiency of various borate compounds as set-retarders of class G oilwell cement", Cement and Concrete Research, 1991, p. 663-668, vol. 21.
Joisel, Albert, "Admixtures for Cement", edited by the author, Ecole Polytechnique, Paris 1973.
Palomo, A., et al., "Alkali-activated cementitous materials: Alternative matrices for the immobilization of hazardous wastes Part I. Stabilisation of boron", Cement and Concrete Research, 2003, p. 281-288, vol. 33.
Pera, J. et al., "Valorization of automotive shredder residue in building materials", Cement and Concrete Research, 2004, p. 557-562, vol. 34.
Peysson, S., et al. "Immobilization of heavy metals by calcium sulfoaluminate cement", Cement and Concrete Research, 2005, p. 2261-2270, vol. 35.
Poellmann, S., et al., "Solid Solution of Ettringites, Part II: Incorporation of $B(OH)_4^-$ and $CrO_4^{2-}$ in $3CaO \cdot Al_2O_3 \cdot 3CaSO_4 \cdot 32H_2O$", Cement and Concrete Research, 1993, p. 422-430, vol. 23.
Ramachandran V.S., et al., "Conduction calorimetric investigation of the effect of retarders on the hydration of Portland cement", Thermochimica Acta, 1992, p. 373-387, vol. 195.
Wenda, R., et al. "$B^{3+}$ in calcium aluminate hydrates", Proc. $8^{th}$ International Congress on the Chemistry of Cement, Rio de Janeiro, 1993, p. 307-313, vol. 3.
International Search Report completed Aug. 31, 2007, in International Application No. PCT/EP2007/054779, filed May 16, 2007.
International Preliminary Report on Patentability dated Aug. 4, 2008, from corresponding International Application No. PCT/EP2007/054779, filed May 16, 2007.
English language translation of the International Preliminary Report on Patentability from corresponding International Application No. PCT/EP2007/054779, filed May 16, 2007.
Mori. T., et al., "Compositions for expansive cements", Chemical Abstract + Indexes, American Chemical Society, Columbus, US, Aug. 26, 1974, p. 230, vol. 81, No. 8.

*Primary Examiner* — Edward Johnson
(74) *Attorney, Agent, or Firm* — Brinks Hofer Gilson & Lione

(57) ABSTRACT

Cement-based composition for the embedding of a boron-containing aqueous solution, said composition being composed of a sulphoaluminate cement optionally comprising gypsum, and of a sand.
Process for embedding, by cementation, of a boron-containing aqueous solution in which said aqueous solution is kneaded, mixed with said cement-based composition.
Cement grout composition thus obtained.

25 Claims, 1 Drawing Sheet

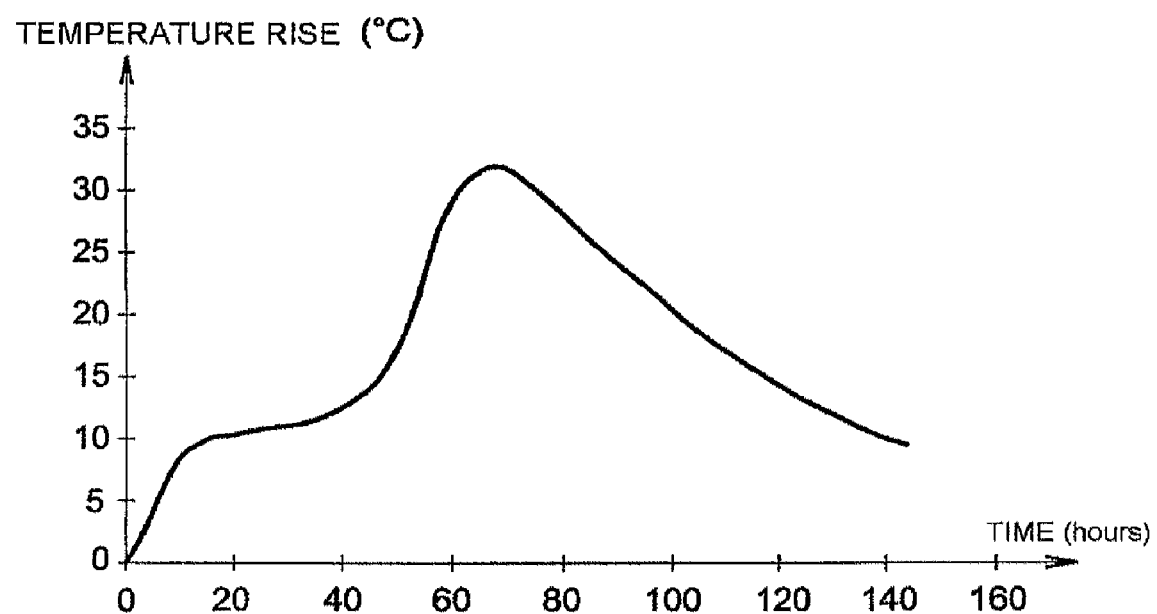

CEMENT-BASED COMPOSITION FOR THE EMBEDDING OF A BORON-CONTAINING AQUEOUS SOLUTION, EMBEDDING PROCESS AND CEMENT GROUT COMPOSITION

This application is a National Stage application of International Application No. PCT/EP2007/054779 filed May 16, 2007, the entire contents of which is hereby incorporated herein by reference. This application also claims the benefit under 35 U.S.C. §119 of French Patent Application No. 06 51823, filed May 18, 2006, the entire contents of which is hereby incorporated herein by reference.

TECHNICAL FIELD

The invention relates to a cement-based composition for the embedding (coating) of a boron-containing aqueous solution and to a process for the embedding by cementation of a boron-containing aqueous solution in which the said aqueous solution is kneaded, mixed with the said cement-based composition.

The invention also relates to the cement-grout composition thus obtained.

The boron-containing aqueous solution which can be embedded by cementation with the cement-based composition according to the invention, according to the grout formulation of the present invention, and by the process according to the invention, is in particular an aqueous solution with a high concentration of boron. This aqueous solution can in particular be composed of boron-comprising aqueous waste originating from industrial processes; for example, it may be aqueous wastes generated by the nuclear industry, such as an aqueous draining solution resulting from the draining, purging of the primary cooling circuit of pressurized water reactors.

It should be specified that the term "grout" is a civil engineering term denoting a water/cement/sand mixture with a rheology favourable to flow. The term "embedded (coated) product" comes under the vocabulary used for the management of waste. It denotes a mixture of waste and optionally water (if the waste is not an aqueous solution)/cement/sand, without reference to the rheology after kneading, mixing. In the context of the invention, the terms "grout" and "embedded product" are generally equivalent.

The technical field of the invention may generally be defined as that of the embedding or inerting of liquid wastes, in particular aqueous wastes, by conditioning, inerting or embedding in a cement-based matrix. More particularly, according to the invention, a subject of interest is the conditioning, inerting or embedding of boron-containing aqueous liquid wastes, in particular aqueous liquid wastes containing high concentrations of boron.

Boron, introduced in the form of boric acid into the primary cooling circuit of pressurized water reactors, acts as neutron absorber in supplementing the control rods.

When the primary circuit is drained, purged the borate-comprising solution becomes a waste which is treated by evaporation, after adjustment of its pH with sodium hydroxide and optional mixing with other streams.

The concentrates obtained generally exhibit a low activity, which is, for example, from 1 to $6 \times 10^{10}$ Bq/m$^3$, but high concentrations of boron, which may reach values as high as 30 to 40 g/L.

These concentrates are conditioned by cementation in order to convert them into a solid, stable, monolithic and confining form, constituting a grout which meets the handling and storage standards, norms. For this, they are kneaded, mixed with a hydraulic binder, the water of the waste serving to hydrate the cement, and then poured into a container.

The embedding (coating) of the wastes, whatever the wastes are, is commonly carried out using a binder which is a silica-lime cement of the Portland type, optionally containing additives such as: blast furnace slag, fly ash, natural or artificial pozzolans, fumed silica, limestone, and the like.

In the case of the borate-comprising wastes with which the invention is particularly concerned, the use of such binders comes up, however, against a major problem: the boron present in the waste inhibits the setting of the cement [1, 2]. Besides, it should be noted that borax $Na_2B_4O_7.10H_2O$ is used as retarder of the setting of injection grouts intended for the lining of oil wells as it is highly effective, even at high temperature [3].

The modes of action commonly evoked in order to explain the delay in hydration caused by the boron are of two types:
 (i) obstructive precipitation by formation of an amorphous gel at the surface of the cement grains, preventing the ionic exchanges necessary for their hydration [1, 4, 5], or
 (ii) chemisorption of the borate ions at the ends of the chains of calcium silicate hydrates (one of the hydrates of the cement), which would block their growth [6].

This obstacle can be partially removed by treating the waste with lime [7, 8]. This is the reference solution currently selected for industrial applications. The lime is generally added to the waste with the cement and the sand at the time of kneading, mixing.

The degree of incorporation by weight of the concentrate is between 18 and 20%. The treatment with lime makes it possible to avoid complete inhibition of the setting by the borates, but exhibits two disadvantages.

First of all, the setting times remain long, generally of the order of one week, and things sometimes go wrong, as some embedded products can take several months to harden. Furthermore, the borate-comprising precipitate formed by addition of the lime: $CaO.B_2O_3.6H_2O$, is rapidly destabilized in the cement matrix. This is because the boron participates in the delayed formation of thermodynamically stable calcium boroaluminates hydrates (phases of $AF_t$ or $AF_m$ type).

Two alternatives have been studied in replacing the lime/Portland cement formulation described above:
 (i) the preparation of an embedding matrix by alkaline activation of fly ash [9]. The proposed formulation exhibits a high degree of incorporation by weight of the waste (36.67%), but the concentration of boron in the waste (15 g/L) is half that commonly encountered in the evaporation concentrates originating from pressurized water nuclear power stations, and the embedding process comprises a stage which is expensive to implement and which consists in hardening at 85° C. for 24 hours.
 (ii) the use of a mixture of lime, of high-alumina cement and optionally of Portland cement targeted at direct precipitation of the borate ions in the form of $AF_t$ or $AF_m$ phases stable in a cement medium.

The $AF_t$ and $AF_m$ phases respectively have the general formulae $[Ca_3(Al,Fe)(OH)_6.12H_2O].X_3.nH_2O$ and $[Ca_2(Al,Fe)(OH)_6].X.nH_2O$, where X denotes a monovalent anion, or a divalent anion. The existence of minerals incorporating boron in the $B(OH)_4^-$ ($AF_t$) or $HBO_3^{2-}$ ($AF_m$) form has been shown by Wenda and Kuzel in 1986 [10]. Poellman et al. [11] have generalized these results by showing the existence of solid solutions between sulphate-comprising and borate-comprising phases.

A first embedding formulation was proposed by Roux [1]. The borate-comprising concentrate, the [B] concentration of which is 35 g/L is kneaded, mixed with a mixture of Portland cement, of high-alumina cement of melt type, of lime and of sand. The degree of incorporation by weight of the waste is set at 21%. The embedded product obtained exhibits advantageous properties: it is a self-levelling material, the setting time of which is 45 h, and the compressive strength after curing for 90 d under water is between 48 and 57 MPa. However, the high number of the constituents of the formulation complicates the composition of the embedding binder.

In 2001, Goni et al. [12] tested the feasibility of the embedding of a waste having a boron concentration of 45 g/L using a mixture of high-alumina cement and of lime. The degree of incorporation by weight of the waste is set at 42%. The material sets in less than 7 days and provides better confinement of the boron, with an effective diffusion coefficient $D_e$ of approximately $10^{-9}$ cm$^2$/s, than a control prepared from Portland cement and from lime, the effective diffusion coefficient $D_e$ of which is approximately $10^{-8}$ cm$^2$/s. However, the mechanical performance of the material obtained might prove to be inadequate in view of the high water dosage of the formulation (E/C=0.95) and the possible long-term conversion of the aluminates phases formed in the first stages of the hydration. Furthermore, the absence of sand in the formulation leads to the expectation of strong dimensional variations in the material in the course of time.

The document WO-A-2006/027554 describes a process for the encapsulation, embedding (coating) of materials by treatment using a cement composition. The materials to be encapsulated, coated, embedded are, for example, wastes and ion-exchange resins, but also metals. These wastes are in particular wastes produced in the nuclear industry. The treatment of boron-containing aqueous solutions is neither mentioned nor evoked. This document does not relate to the conditioning of boron-containing waste.

There does exist, in the light of the above, a need for a cement-based formulation for the embedding of a boron-containing aqueous solution, for a process for the embedding by cementation of a boron-containing aqueous solution, employing the said cement formulation, and for a cement grout formulation obtained by kneading, mixing the said boron-containing aqueous solution with the said cement-based formulation, this process and/or these grouts and/or cement formulations being in particular:

- simple and reliable and not resulting in excessive application costs;
- not involving treatment with lime;
- making possible the embedding of aqueous solutions with high concentrations of boron, or greater than or equal, for example, to 35 g/l, such as the evaporation concentrates produced by the plants for the treatment of the effluents from pressurized water nuclear reactors;
- making possible the embedding of all types of boron-containing solutions, whatever their origins;
- not requiring an additional supply of water, the cement being hydrated by the water provided by the solution, such as a waste product;
- allowing a degree of incorporation by weight of the solution, such as a waste product, of greater than 20%, which is the degree of incorporation of a reference formulation with treatment with lime of the solution such as a waste product;
- corresponding to the constraints of industrial implementation with regard to viscosity and setting time. In particular, the cement grout composition according to the invention specifically must have a viscosity which allows the kneader, mixer to be easily emptied and which limits the volume of rinsing water; the setting time must be greater than 5 hours, in order to remove any risk of setting in the kneader, mixer in the event of a breakdown in operation, and less than one week, which is the setting time for the reference formulation with treatment with lime of the waste;
- making it possible to provide confinement of the boron.

In addition, in the case where the solution treated is a radioactive solution, such as a radio-active waste product, the embedded waste, after embedding with the cement-based composition according to the invention and according to the cement grout formulation according to the invention must also meet the criteria for admission to a surface storage site for low-level waste [13, 14].

In France, these admission criteria are as follows:
- absence of exuded water not taken up by 24 hours;
- compressive strength of greater than 8 MPa after curing for 90 days at 20° C. under air, under water or in a leaktight bag.

The aim of the present invention is to provide a cement-based composition, a cement grout, and a process for embedding, by cementation, of a boron-containing aqueous solution which meet the needs, restrictions, requirements and criteria listed above.

The aim of the present invention is also to provide a cement-based composition, a cement grout composition and a process for embedding, by cementation, of a boron-containing aqueous solution which do not exhibit the disadvantages, failings, limitations and drawbacks of the compositions and processes of the prior art and which solve the problems of the compositions and processes of the prior art.

The aim of the present invention is, in addition to accelerate the setting of the boron-containing cement or encapsulated grout, with respect to the conventional formulations, while retaining all the advantageous properties of the material and in particular the properties of the material which allow it to be employed industrially and to be subsequently admitted on to a storage site.

This aim, and yet others, are achieved in accordance with the invention by a cement-based composition for the embedding of a boron-containing aqueous solution, said composition being composed of a sulphoaluminate (sulphoaluminous) cement optionally comprising gypsum, and of a sand.

Such a cement-based composition, intended for the embedding of a boron-containing aqueous solution has never been described or suggested in the prior art.

The invention additionally relates to a process for embedding, by cementation, a boron-containing aqueous solution in which the aqueous solution is kneaded, mixed with said cement-based composition Such a process has likewise never been described or suggested in the prior art.

Finally, the invention relates to a cement grout composition prepared by kneading, mixing the boron-containing aqueous solution, which is the solution to be conditioned, with said cement-based composition.

Such a cement grout composition has also never been described or suggested in the prior art.

The terms "cement grout" are terms having an unambiguous meaning for a person skilled in the art in the field of cement and which are commonly used in this technical field.

The compositions (based on cement and cement grout) and the process according to the invention meet the needs, restrictions, requirements and criteria listed above, making it possible to overcome the disadvantages, failings, limitations and drawbacks of the compositions and processes of the prior art and provide a solution to the problems of the compositions and processes of the prior art.

This is demonstrated in the examples below.

In particular, the embedded product, which can also be referred to as cement grout, that is to say the mixture obtained subsequent to the kneading, mixing of the boron-containing solution with the cement-based composition according to the invention (sand, cement and optionally gypsum), generally has a degree of incorporation by weight of boron of 21.8 to 30.5%, which is greater by a factor of 1.1 to 1.5 than the degree of incorporation of the embedded products prepared according to the formulations of the prior art with treatment with lime. The setting time of the embedded product (evaluated by the time for which the temperature rise generated by the hydration reactions of the cement is at a maximum by Langavant semi-adiabatic calorimetry) is generally from 26 to 111 hours, and the most often less than 80 h, which exhibits an acceleration in the setting generally by a factor of 1.6 to 8.1 in comparison with the embedded products prepared according to the formulations of the prior art with treatment with lime of the boron-containing waste.

In addition, surprisingly, this significant increase in the weight of solution, waste, incorporated, which goes hand in hand with a very significant acceleration in the setting, is not damaging to the other properties of the embedded material as regards in particular fluidity, bleeding, temperature rise and mechanical strength.

Thus, there may be noted an absence of bleeding at 24 hours, a temperature rise of less than 60° C. during setting, a fluidity which is that of a grout (generally defined by a gravity flowing time of one liter of material through a Marsh cone with a 12.5 mm nozzle of less than 90 s) without addition of organic adjuvants, and a mechanical compressive strength (after setting) which exceeds the limit of 8 MPa from 28 days, and also after 90 days of storage at ambient temperature under water, in a leaktight bag or under air.

The embedded materials according to the invention make it possible to obtain a very slight expansion, which is a sought for and desirable property, and even, in certain cases, a shrinkage. In other words, the materials according to the invention are not expansive materials. Thus, it may be noted that the embedded product according to the invention, as a result in particular of the nature of the cement employed, exhibits a shrinkage and an expansion when it is stored under air (see formulation II, Example 1).

Likewise, the embedded materials according to the invention have a very low expansion under water (see formulation II of Example 1).

According to the invention, the cement-based composition, which is intended for the embedding of boron-containing aqueous solutions, comprises a specific, appropriate mixture of sand and of sulphoaluminate cement.

According to the invention, the cement grout composition likewise comprises a specific, appropriate mixture of sand, of sulphoaluminate cement, and of boron-containing solution.

Without wishing to be bound by any theory, the sulphoaluminate (sulphoaluminous) cement forms, by hydration ettringite (sulphate comprising $AF_t$ phase) and/or calcium monosulphoaluminate hydrate (sulphate-comprising $AF_m$ phase) capable of incorporating, in their structure, the boron supplied by the aqueous solution such as a waste.

The possibilities of ionic substitution offered by the hydrates of a sulphoaluminate cement have already been taken advantage of in rendering inert wastes rich in heavy metals [15, 16] or pulverulent final industrial wastes such as incineration and metallurgy residues [17].

However, the wastes concerned here are very different from the boron-containing wastes which are treated according to the invention. The problems which present themselves with these types of wastes are also fundamentally different from the problems posed by the boron-containing wastes. The compositions described in these documents mention neither sand nor gypsum.

Surprisingly, according to the present invention it is shown that a sulphoaluminate cement, optionally comprising from 0 to 30% of gypsum, may be used alone, namely in particular without Portland or other (cement) being added thereto, combined with sand, for the embedding of aqueous solutions, for example aqueous wastes, containing very high concentrations of boron, in any case greater than those treated with the cement compositions and with the processes of the prior art (for example greater than or equal to 35 g/l), provided that, if necessary, the pH of the waste is adjusted to a value of greater than or equal to 11, and preferably of between 11 and 12.

The document [18] describes a sulphate-comprising binder, the composition of which differs from that of the cement participating in the formulation of the invention (absence of gypsum, absence of sand, no incorporation of borate-comprising solution) and the basic function of which is to improve the mechanical compressive strength of conventional binders, such as plaster.

In other words, the cement-based composition according to the invention, the process which employs this composition, and the grout obtained are different from the compositions and processes of the prior art in particular as a result of the type of cement employed, its combination with sand, and the type of aqueous solutions, or aqueous wastes treated.

In addition, the purpose desired by the compositions and processes of the prior art, namely to reduce the soluble fraction of the waste, is very different from the main purpose desired and achieved in the present invention, which is, above all, to accelerate the setting of the embedded product and to increase the degree of incorporation of the solution in comparison with conventional formulations, while retaining the properties of the material which allow it to be employed industrially and to subsequently admit it to a storage site.

In other words, according to the invention, the problem of the delay in setting of the cement brought about by the boron is solved and it is possible, in comparison with a conventional embedding, to significantly increase the degree of incorporation of a "borate-comprising" waste, while reducing the setting time of the material obtained and while guaranteeing good properties after hardening.

In a more detailed fashion, the cement-based composition according to the invention comprises a sulphoaluminate (sulphoaluminous) cement. The distinction between a sulphoaluminate cement and a calcium sulphoaluminate should be remembered: a sulphoaluminate cement comprises a phase of calcium sulphoaluminate type (yeelimite: $4CaO.3Al_2O_3.SO_3$ or $C_4A_3\bar{S}$), which is generally the predominant phase in clinker, but this cement also comprises other phases, such as dicalcium sulphate, perovskite, anhydrite, and calcium aluminates.

Such a sulphoaluminate cement can, for example, be composed of a clinker with the following mineralogical composition (by weight): $C_4A_3\bar{S}$: 72.8%; $C_2S$: 13.4%; $C_3FT$: 8.0%; $C_{12}A_7$: 3.1%; MgO: 1.7%; $C\bar{S}$: 0.7% according to the normal cement notation (C=CaO, $\bar{S}$=SiO$_2$, S (underlined)=SO$_3$, A=Al$_2$O$_3$, F=Fe$_2$O$_3$, T=TiO$_2$).

Advantageously, the cement can contain up to 30% by weight of gypsum (0 to 30%), preferably from 5 to 20% by weight of gypsum, for example 10 to 15% by weight of gypsum. The gypsum, which promotes the formation of the $AF_t$ phase at the expense of the $AF_m$ phase is a significant factor in adjusting the properties of the embedded product.

The proportion of gypsum is a significant parameter. This is because, in the case of the conditioning of "borate-comprising" solutions, the inventors have demonstrated that, surprisingly, a dosage of gypsum of greater than 30% results in the cracking of the material after hardening.

The cement-based composition and the cement grout composition according to the invention comprise a sand which is preferably a non-alkali-reactive sand which is, for example, a Fontainebleau siliceous sand. The sand preferably has a particle size of 0 to 1 mm, more preferably of 0 to 350 μm, in order to provide high fluidity of the embedded product after kneading, mixing.

The compositions according to the invention do not comprise lime. This is because this component is deliberately omitted from the compositions according to the invention as its presence would bring about an abnormal expansion of the materials.

More specifically, in the process of embedding, by cementation, a boron-containing aqueous solution, the following successive stages are carried out:
the cement-based composition described above is kneaded, mixed with the boron-containing aqueous solution in order to obtain a cement grout constituting an embedded product;
said embedded product is run into (pour into) a container;
the setting of said embedded product is allowed to take place in the container;
the container is closed.

More specifically, after having run (poured) the said embedded product into a container, the container is removed to a maturing room in which the setting of the embedded product and the closing of the container take place.

Generally, per one hundred parts of cement (the said cement optionally comprising a certain amount of gypsum), the proportion of boron-containing aqueous solution is from 60 to 70 parts, and that of sand is from 50 to 125 parts. This proportion generally corresponds approximately to the water content within the material prepared, which is thus generally approximately 60 to 70 parts.

Under these conditions, the degree of incorporation by weight of the waste in the embedded product is generally from 21.8% to 30.5% and the specifications expected for the embedded product (fluidity, setting, bleeding, mechanical strength) are met.

The aqueous solution treated by the process of the invention and participating in the composition of the cement grout according to the invention generally contains from 10 to 50 g/l of boron, preferably from 20 to 40 g/l of boron.

The process according to the invention and the cement grout formulation according to the invention make it possible to treat solutions exhibiting high concentrations of boron, for example, greater than or equal to 35 g/l, for example, from 35 to 50 g/l.

The boron may be present in the form of boric acid, and/or of borate ions and/or of polyboric ions.

The boron-containing aqueous solution may be any kind of solution; it may, for example, be a liquid aqueous discharge or waste originating from a process, from an industrial plant, from an emptying, from a draining of a reactor or tank, from a washing or cleaning operation, and the like.

This solution can be a radioactive solution, in particular of low activity.

The process, the cement-based composition and the cement grout formulation according to the invention, make it possible in particular to treat the aqueous solutions resulting from the draining of the primary cooling circuit of a pressurized water reactor.

Prior to the kneading, mixing, the pH of the boron-containing aqueous solution (also known as "borate-comprising solution") should generally be adjusted to a value greater than or equal to 11, preferably of between 11 and 12, more preferably from 11.2 to 11.9, better still from 11.5 to 11.75, even better still from more than 11.5 to 11.75.

Preferred values of the pH are, for example, 11.2, 11.5, 11.75 and 11.9.

This is because the pH of the waste plays a very important role with regard to the setting time of the embedded product.

On the other hand, it should be noted that there is generally, according to the invention, no requirement with regard to the pH of the cement composition.

It could be demonstrated that, within the pH range generally recommended, according to the invention (for example, from 11.2 to 11.9), the heat of hydration of the cement prepared with a borate-comprising solution, is analogous to that of a control cement prepared with pure water, which shows that the inhibition of hydration is suppressed within this specific pH range according to the invention, whereas this inhibition of hydration exists for pH values lying outside the range generally recommended according to the invention, for example, for a pH of 10.6.

The pH can be adjusted, for example, by addition of sodium hydroxide to the boron-containing aqueous solution.

The boron-containing aqueous solution is generally kneaded, mixed at a temperature of 10° C. to 80° C., preferably of 20° C. to 60° C. A temperature of 60° C. before cementation makes it possible to avoid any risk of recrystallization of the salts in the storage tank upstream of the kneading, mixing.

However, the process, the cement-based composition and the cement grout formulation according to the invention also make it possible to carry out the conditioning or the embedding at ambient temperature, generally from 10° C. to 30° C., preferably from 15 to 25° C., for example 18° C.

Generally, the pulverulent constituents (cement, sand, gypsum) are kneaded, mixed beforehand or pre-kneaded, premixed and these premixed constituents are subsequently kneaded, mixed with the solution, but any other mode of mixing and order of mixing the cement, sand, or solution can be envisaged.

The kneading, mixing can be carried out in a known kneading, mixing device, for example a kneader, mixer of Guedu type with a rotary blade at the vessel bottom.

Setting generally takes place in a period of time of less than one week, preferably from 26 to 111 hours, which is, as it has already been seen, clearly less than the setting times of the prior art. Furthermore, it is preferable or desirable for the setting time to be greater than 6 hours, in particular in the case of the conditioning of nuclear waste, in order to remove any risk of setting of the embedded product in the kneader, mixer, in the event of breakdown (malfunction). This criterion is adhered to in particular within the preferred range of 26 to 111 hours, mentioned above.

This setting is accompanied by a slight temperature rise generally less than 60° C.

The invention will now be described with reference to the following examples, given by way of illustration and without implied limitation in connection with the appended drawing, in which:

FIG. 1 is a graph which gives the temperature rise (° C.) as a function of the time (hours) of the core of an embedded product prepared according to formulation VI from a waste at 18° C. and placed in a Langavant semi-adiabatic calorimeter.

EXAMPLES

Example 1

Embedding Formulation with a High Degree of Incorporation of the Waste

The waste under consideration is formed of an aqueous solution composed, for a volume of one liter, of 200 g of boric acid $H_3BO_3$ and of 46 g of sodium hydroxide NaOH. It is cemented according to two strategies:
treatment of the waste with lime and embedding with a Portland cement according to a formulation currently employed in conditioning plants (formulation I),
embedding with a sulphoaluminate cement according to the present invention (formulation II).

The mineralogical compositions of the two cements used are summarized in Table 1.

TABLE 1

| Mineralogical composition of the cements used | | |
|---|---|---|
| | Portland cement | Sulphoaluminate cement |
| Mineralogical composition of the clinker | $C_3S$: 65.6%<br>$C_2S$: 16.0%<br>$C_3A$: 4.04%<br>$C_4AF$: 5.6% | $C_4A_3\underline{S}$: 72.8%<br>$C_2S$: 13.4%<br>$C_3FT$: 8.0%<br>$C_{12}A_7$: 3.1%<br>MgO 1.7%<br>$C\underline{S}$: 0.7% |
| Degree of gypsification of the binder | 3.5% | 19.7% |

Use is made, in this table, of the conventional cement notation, namely:
C=CaO;
$S=SiO_2$;
S (underlined)=$SO_3$;
A=$Al_2O_3$;
F=$Fe_2O_3$;
T=$TiO_2$.

In order to approach the processing conditions in conditioning plants, the waste is brought to 60° C. Its pH, in the case of the embedding with a sulphoaluminate cement, is adjusted to 11.5 by addition, for a volume of 1 l, of 83.5 g of sodium hydroxide NaOH. The waste is subsequently kneaded, mixed with the premixed pulverulent products according to the formulations described in Table 2. The sand used is a Fontainebleau siliceous sand with a particle size of 0-350 μm.

TABLE 2

| Embedding formulations (per 100 g of cement) and properties of the materials obtained | | |
|---|---|---|
| | Formulation I | Formulation II |
| Composition of the embedded product | Portland cement 100 g<br>Sand 75 g<br>Lime 6 g<br>Waste 40 g | Sulphoaluminate cement 100 g<br>Sand 50 g<br>Waste 65 g |
| Amount of incorporation by weight of the waste | 18% | 30.2% |
| Flow time with the Marsh cone (12.5 mm nozzle) | — | 39 s |
| Bleeding | 1 h: 0%<br>3 h: 0%<br>24 h: 0% | 1 h: 0%<br>3 h: 0%<br>24 h: 0% |
| Heat setting | 185 h | 57 h |
| Maximum temperature rise | 37° C. | 55° C. |
| Compressive strength | 90 d—water: 72 MPa<br>90 d—bag: 63 MPa<br>90 d—air: 70 MPa | 28 d—water: 53 MPa<br>28 d—bag: 48 MPa<br>28 d—air: 44 MPa |
| Dimensional variations | 28 d—water: +344 μm/m<br>28 d—bag: −500 μm/m<br>28 d—air: −993 μm/m | 28 d—water: +780 μm/m<br>28 d—bag: +44 μm/m<br>28 d air: −275 μm/m |

The embedded products obtained form the subject of a series of characterizations (Table 2):
evaluation of the fluidity by measuring the flow time of one liter of embedded product through a Marsh cone provided with a 12.5 mm nozzle;
measurement of the bleeding at 1 h, 3 h and 24 h on 100 ml of embedded product according to standard NF P 18-507;
evaluation of the setting time by measuring the time for which the temperature rise of 1575 g of embedded product placed in a Langavant semi-adiabatic calorimeter as defined by standard NF P 15-436 is at a maximum;
measurement of the compressive strength on 4×4×16 cm test specimens stored at ambient temperature under water, in a bag or under air according to standard EN 196-1;
measurement of the longitudinal variation of 4×4×16 cm test specimens stored at ambient temperature under water, in a bag or under air.

The measurement of the "heat setting" was preferred to the measurement of the Vicat setting as the latter is very imprecise in the case of slow setting materials.

It is apparent that, in comparison with the reference formulation I, the present invention makes it possible to increase the degree of incorporation by weight of the waste in the embedded product by a factor of 1.67 while accelerating the setting of the material by a factor of 3.2. Over the duration of the study, the material obtained exhibits favourable characteristics:
absence of bleeding,
temperature rise of less than 60° C.,
fluidity of grout type without addition of organic adjuvants,
mechanical strength greatly exceeding the limit of 8 MPa from the term of 28 d,
moderate dimensional variations, with a shrinkage cancelled out in the leaktight bag.

The embedded product according to the invention (formulation II) exhibits a shrinkage when it is stored under air, which is, for example, 0.028%, after curing under air for 28 days, which is very low.

Example 2

Rapid Setting Formulations

The waste under consideration is formed of an aqueous solution composed, for a volume of one liter, of 200 g of boric acid $H_3BO_3$ and of 46 g of sodium hydroxide NaOH. It is cemented according to three alternative forms of the present invention.

In order to approach the processing conditions in conditioning plants, the waste is brought to 60° C. After adjusting the pH, the waste is kneaded, mixed with the premixed pulverulent products according to the formulations described in Table 3. The sand used is a Fontainebleau siliceous sand with a particle size of 0-350 μm.

TABLE 3

Embedding formulations and properties of the materials obtained

|  | Formulation III | Formulation IV | Formulation V |
|---|---|---|---|
| Adjustment value of the pH | 12 | 11.75 | 11.75 |
| Weight of sodium hydroxide added (per 1 l of waste) | 94.1 g | 87.7 g | 87.7 g |
| Gypsification of the sulphoaluminate cement | 15% | 8% | 17.3% |
| Embedding formulation | Cement 100 g<br>Sand 87.5 g<br>Waste 65 g | Cement 100 g<br>Sand 87.5 g<br>Waste 65 g | Cement 100 g<br>Sand 125 g<br>Waste 65 g |
| Amount of incorporation by weight of the waste | 25.7% | 25.7% | 22.4% |
| Flow time with the Marsh cone (12.5 mm nozzle) | 34 s | 25 s | 80 s |
| Bleeding | 1 h: 0%<br>3 h: 0%<br>24 h: 0% | 1 h: 0%<br>3 h: 0%<br>24 h: 0% | 1 h: 0%<br>3 h: 0%<br>24 h: 0% |
| Heat setting | 26 h | 35 h | 44 h |
| Maximum temperature rise | 47.5° C. | 56.2° C. | 47.3° C. |
| Compressive strength | 28 d—water: 51 MPa<br>28 d—bag: 47 MPa<br>28 d—air: 44 MPa | 28 d—water: 38 MPa<br>28 d—bag: 36 MPa<br>28 d—air: 32 MPa | 28 d—water: 62 MPa<br>28 d—bag: 64 MPa<br>28 d—air: 46 MPa |

The embedded products obtained form the subject of characterizations according to protocols analogous to those presented in Example 1. It is apparent that, over the duration of the study, the alternative forms of the present invention make possible a reduction in the setting time of the embedded products by a factor 4 to 7, in comparison with reference formulation I, without unacceptable deterioration in their properties or without reduction in the degree of incorporation of the waste.

Example 3

Embedding of a Waste at 18° C.

The waste under consideration is formed of an aqueous solution composed, for a volume of one liter, of 200 g of boric acid $H_3BO_3$ and of 130.4 g of sodium hydroxide NaOH. Its temperature is 18° C. at the time of the embedding.

The embedded product is prepared according to formulation VI by kneading, mixing the waste with a mixture of sulphoaluminate cement, the gypsum level of which is 10.3% and of siliceous sand with a particle size of 0-350 μm.

| Formulation VI: | Sulphoaluminate cement: 100 g<br>Sand: 150 g<br>Waste: 65 g |
|---|---|

The progression of the hydration of the cement is monitored by measuring the temperature rise at the core of a weight of 1575 g of embedded product placed in a Langavant calorimeter as defined in standard NF P 15-436. The recording obtained is presented in FIG. 1.

The observation of a temperature peak at the term of 67 h testifies to the progression of the hydration. This example thus illustrates the possibility offered by the present invention of conditioning waste not heated beforehand.

Example 4

Ability of the Sulphoaluminate Cement to Confine Boron

In order to evaluate the ability of the sulphoaluminate cement to confine boron, pastes are prepared by mixing 100 g of cement and 45 g of an aqueous solution comprising 9 g of boric acid and 6.5 g of sodium hydroxide NaOH. The level of gypsum in the sulphoaluminate cement is 0, 10, 20 or 30%. The temperature of the waste is 20° C. The materials obtained are stored in a leaktight bag. At the terms 1 and 28 days, samples, if necessary milled, are placed in suspension in ultra pure water with a (volume of water/weight of solid) ratio of 9 ml/g. The amount of boron released into solution is analysed after stirring for 24 hours. The results obtained are summarized in the Table 4.

TABLE 4

Boron fraction leached from the sulphoaluminate cement pastes

| Age of the sample | Cement comprising 0% of gypsum | Cement comprising 10% of gypsum | Cement comprising 20% of gypsum | Cement comprising 30% of gypsum |
|---|---|---|---|---|
| 1 d | 4.9 | 4.1 | 3.2 | 4.0 |
| 28 d | 3.1 | 1.3 | 1.3 | 1.8 |

It is apparent that, from the first stages of the hydration, a significant fraction of the boron is inserted in the solid structure of the materials and said fraction is weakly labile: the boron fraction leached from samples aged 1 day is less than 5%. Furthermore, the binders comprising 10 or 20% of gypsum exhibit the best performances in confining the boron at the term of 28 d: 98.7% of the boron initially present in the mixing solution is rendered insoluble.

This example illustrates the ability of the sulphoaluminate cement used in the present invention to confine boron.

Example 5

Embedding a Waste with a Very High Boron Concentration ([B]=50 g/l)

The waste under consideration is formed of an aqueous solution composed, for a volume of one liter, of 286.11 g of boric acid $H_3BO_3$ and of 194 g of sodium hydroxide NaOH. Its pH at 60° C. is 12.

In order to approach the processing conditions in conditioning plants, the waste is brought to 60° C. The waste is kneaded, mixed with the premixed pulverulent products according to formulation III described above in Example 2. The sand used is a Fontainebleau siliceous sand with a particle size of 0-350 μm.

The embedded product obtained forms the subject of characterizations according to protocols analogous to those presented in Example 1 (Table 5).

TABLE 5

|  | Formulation III |
|---|---|
| pH of the waste (60° C.) | 12 |
| Gypsification of the sulphoaluminate cement | 15% |
| Embedding formulation | Cement 100 g<br>Sand 87.5 g<br>Waste 65 g |
| Amount of incorporation by weight of the waste | 25.7% |
| Flow time with the Marsh cone (12.5 mm nozzle) | 77 s |
| Bleeding | 1 h: 0%<br>3 h: 0%<br>24 h: 0% |
| Heat setting | 37.8 h |
| Maximum temperature rise | 46° C. |
| Compressive strength | 28 d—water: 35 MPa<br>28 d—bag: 32 MPa<br>28 d—air: 31 MPa |

Over the duration of the study, the material has favourable characteristics (Table 5): setting in less than 40 h despite the extreme concentration of setting retarder, greater degree of incorporation by weight (25.7%) than those of the formulations with treatment with lime according to the prior state of the art (18-20%), flow with a Marsh cone in less than 90 s, absence of bleeding, moderate temperature rise during the hydration, and compressive strength at 28 d much greater than the minimum limit required of 8 MPa.

This example thus illustrates that, with the cement-based composition described in the present invention, it is possible to condition waste with a very high boron content ([B]=50 g/l).

Example 6

Influence of the pH on the Setting Time of the Material for Embedding a Borate-Containing Waste The boron concentration is 35 g/l in the mixing solution. The water/cement and sand/cement ratios by weight are 0.5 and 3, respectively.

The sulphoaluminate cement used comprises 20% of gypsum.

TABLE 6

Influence of the pH on the setting time of the material for embedding the borate-containing waste (Example 6)

| pH | Heat of hydration (J/g of binder) |
|---|---|
| 8.2 | — |
| 9.4 | 54 |
| 10.6 | 100 |
| 11.2 | 297 |
| 11.9 | 290 |
| Control mixed with pure water | 300 |

Table 1 shows that the use of the formulation described in the document WO-A-2006/027554 would not be suited to conditioning a borate-containing solution. At pH 10.6, in the optimum region identified in this document, our tests show that the heat of hydration of the cement represents only a third of that of a control mixed with pure water (300 J/g), which testifies to an inhibition of the hydration of the cement. On the other hand, for a pH of 11.2 or 11.9, such as is generally recommended according to the invention, the heat of hydration of the cement is comparable with that of the control, which shows that the inhibition of the hydration has been suppressed.

REFERENCES

[1] C. Roux, "Conditionnement par des Liants Hydrauliques de Concentrats Boratés Radioactifs" ["Conditioning by Hydraulic Binders of Radioactive Borate-comprising Concentrates"], Doctoral thesis of the UniversitéParis Sud-Orsay (1989)

[2] V. S. Ramachandran, M. S. Lowery, "Conduction Calorimetric Investigation of the Effect of Retarders on the Hydration of Portland Cement", *Thermochimica Acta*, 195 (1992), 373-387

[3] J. Bensted, I. C. Callaghan, A. Lepre, "Comparative Study of the Efficiency of Various Borate Compounds as Set-Retarders of Class G Oilwell Cement", *Cem. Concr. Res.*, 21 (1991), 663-668

[4] A. Joisel, "Les Adjuvants di Ciment" ["Cement Adjuvants"], edited by the author, Ecole Polytechnique, Paris (1973)

[5] J. M. Casabonne Masonnave, "Immobilization of Borates and Phosphates Anions with Saturated Lime Solutions", *Solid State Tonics*, 59 (1993), 133-139

[6] I. S. Bell, P. Coveney, "Molecular Modelling of the Mechanism of Action of Borate Retarders on Hydrating Cements at High Temperature", *Molecular Simulation*, 20 (1998), 331-356

[7] A. Saas, P. Vaunois, "Enrobage de Dechets dans les Liants Hydrauliques" ["Embedding of Waste in Hydraulic Binders"], *Rapport Technique CEA/DRDD No.* 85/84 (1985)

[8] E. Benavides, "Immobilization of Evaporator Concentrates with High Boron Content in Cement Matrix", *SIEN '97, International Symposium on Nuclear Energy Radioactive Waste Management, Bucharest,* 2 (1997), 470-471

[9] A. Palomo, J. I. Lopez de la Fuente, "Alkali-Activated Cementitious Materials: Alternative Matrices for the Immobilization of Hazardous Wastes—Part I—Stabilisation of Boron", *Cem. Concr. Res.*, 33 (2003), 281-288

[10] R. Wenda, H. J. Kuzel, *Proc. 8th International Congress on the Chemistry of Cement, Rio de Janeiro*, 3 (1983), 37-38

[11] H. Poellmann, S. Auer, H. J. Kuzel, "Solid Solution of Ettringites—Part II—Incorporation of $B(OH)_4^-$ and $CrO_4^{2-}$ in $3CaO.Al_2O_3.3CaSO_4.32H_2O$", *Cem. Concr. Res.*, 23 (1993), 422-430

[12] S. Goni, A. Guerrero, "Stability of Calcium Aluminate Cement Matrices Mixed with Borate Solution", *Proc. Intern. Conf. On Calcium Aluminate Cements CAC*, ISBN 1-86125-142-4 (2001), 425-435

[13] ANDRA Technical Specification No. ACO SP ASRE 99-004/A

[14] ANDRA Technical Specification No. ACO SP ASRE 99-005/A

[15] J. Pera, J. Ambroise, M. Chabannet, "Valorization of Automotive Shredder Residue in Building Materials", *Cem. Concr. Res.*, 34 (2004), 557-562

[16] S. Peysson, J. Pera, M. Chabannet, "Immobilization of Heavy Metals by Calcium Sulphoaluminate Cement", in *Cem. Concr. Res.*, (2005), 2261-2270

[17] B. Classen, B. Le Rolland, P. Colombet, "Procédé d'Inertage de Déchets par Enrobage dans un Liant Hydraulique et Premix pour la Mise en (Euvre de ce Procédé" ["Process for Rendering Inert Waste by Embedding in a Hydraulic Binder and Premix for the Implementation of this Process"], Patent FR 2 796 934 A1 (1999), EP-A1-1072567 A1

[18] G. Li, H. Hornain, J. Couturier, "Liant Hydraulique Résultant du Melange d'un Liant Sulfatique et d'un Liant Comprenant le Composé Minéralogique C4A3$\overline{S}$" ["Hydraulic Binder resulting from the Mixing of a $\overline{S}$ulphate-comprising Binder and of a Binder comprising the Mineralogical Compound C4A3$\overline{S}$"], Patent FR-A1-2807424 (2001)

The invention claimed is:

1. A process for embedding, by cementation, a boron-containing aqueous solution, comprising:
   kneading the boron-containing aqueous solution with a cement-based composition comprising a sulphoaluminate cement, sand, and optionally gypsum,
   wherein, per one hundred parts of cement by weight, the proportion of boron-containing aqueous solution is from 60 to 70 parts, and the proportion of sand is from 50 to 125 parts, and wherein the aqueous solution comprises from 10 to 50 g/l of boron.

2. The process of claim 1, wherein a predominant phase of a constituent clinker of the sulphoaluminate cement is yeelimite.

3. The process of claim 2, wherein the constituent clinker of the sulphoaluminate cement has the following mineralogical composition: 72.8% of $C_4A_3\overline{S}$; 13.4% of $C_2S$; 8.0% of $C_3FT$; 3.1% of $C_{12}A_7$; 1.7% of $\overline{M}gO$ and 0.7% of $C\overline{S}$.

4. The process of claim 1, wherein the sulphoaluminate cement comprises from 0 to 30% by weight of gypsum.

5. The process of claim 1, wherein the sand is a non-alkali-reactive sand.

6. The process of claim 1, wherein the sand is a Fontainebleau siliceous sand.

7. The process of claim 1, wherein the sand has a particle size of 0 to 1 mm.

8. The process of claim 1, wherein the following successive stages are carried out:
   kneading the cement-based composition with the boron-containing aqueous solution in order to obtain a cement grout constituting an embedded product;
   running said embedded product into a container;
   allowing setting of said embedded product to take place in the container; and
   closing said container.

9. The process of claim 1, wherein the boron is present in the form of boric acid, borate ions, and/or polyboric ions.

10. The process of claim 1, wherein the solution is a radioactive solution.

11. The process of claim 1, wherein the boron-containing aqueous solution is a solution resulting from draining of a primary cooling circuit of a pressurized water nuclear reactor.

12. The process of claim 1, further comprising, prior to kneading, adjusting the pH of the boron-containing aqueous solution to a value of greater than or equal to 11.

13. The process of claim 1, wherein the temperature of the boron-containing aqueous solution is from 10 to 80° C.

14. The process of claim 8, wherein a setting time of the embedded product is less than one week.

15. A cement grout composition for the embedding of a boron-containing aqueous solution, comprising:
   a cement-based composition comprising a sulphoaluminate cement, sand, and optionally gypsum; and
   a boron-containing aqueous solution,
   wherein per one hundred parts of cement by weight, the proportion of boron-containing aqueous solution is from 60 to 70 parts, and the proportion of sand is from 50 to 125 parts and wherein the aqueous solution comprises from 10 to 50 g/l of boron.

16. The composition of claim 15, wherein the boron is present in the form of boric acid, borate ions, and/or polyboric ions.

17. The composition of claim 15, wherein the solution is a radioactive solution.

18. The composition of claim 17, wherein the boron-containing aqueous solution is a solution resulting from draining of a primary cooling circuit of a pressurized water nuclear reactor.

19. The composition of claim 15, wherein the pH of the boron-containing aqueous solution is adjusted to a value of greater than or equal to 11.

20. The composition of claim 15, wherein the temperature of the boron-containing aqueous solution is from 10 to 80° C.

21. The composition of claim 15, wherein the composition has a setting time of less than one week.

22. The composition of claim 15, wherein the composition exhibits the fluidity of a grout.

23. The composition of claim 15, wherein the composition does not exhibit bleeding at 24 h.

24. The composition of claim 15, wherein the composition, after setting, has a mechanical compressive strength of greater than 8 MPa after storing at ambient temperature for 28 days under water, in a leaktight bag or under air.

25. The composition of claim 15, wherein an amount of incorporation by weight of the aqueous solution in the cement grout is from 21.8% to 30.5%.

* * * * *